United States Patent [19]

Stidworthy

[11] Patent Number: 4,802,376

[45] Date of Patent: Feb. 7, 1989

[54] VARIABLE PHASE AND OSCILLATORY DRIVES

[76] Inventor: Frederick M. Stidworthy, 2 Butlers Close, Long Compton nr. Shipston-on-Sour, Warwickshire, England, CV36 5JY

[21] Appl. No.: 2,693

[22] PCT Filed: May 9, 1986

[86] PCT No.: PCT/GB86/00256
§ 371 Date: Feb. 27, 1987
§ 102(e) Date: Feb. 27, 1987

[87] PCT Pub. No.: WO86/06788
PCT Pub. Date: Nov. 20, 1986

[30] Foreign Application Priority Data

May 9, 1985 [GB] United Kingdom ............... 8511680

[51] Int. Cl.[4] ..................... F01L 1/34; F16H 35/02
[52] U.S. Cl. ........................... 74/394; 123/90.15
[58] Field of Search ................. 74/394, 393, 63; 123/90.15, 90.2

[56] References Cited

U.S. PATENT DOCUMENTS

| | | | |
|---|---|---|---|
| 1,680,899 | 8/1928 | McCall | 74/394 |
| 1,818,555 | 8/1931 | Helland | 74/394 |
| 2,374,718 | 5/1945 | Andrew | 74/63 |
| 2,915,911 | 12/1959 | Hebeler et al. | 74/63 |
| 3,173,525 | 3/1965 | Hergert | 74/394 |
| 3,204,330 | 9/1965 | Pomermacki | 74/394 |
| 3,658,001 | 4/1972 | Seybold | 74/394 |
| 3,686,963 | 8/1972 | Phatah | 74/63 |
| 3,820,411 | 6/1974 | Rudolph | 74/394 |
| 3,960,024 | 6/1976 | Mori et al. | 74/394 |
| 4,509,380 | 4/1985 | Speich | 74/63 |

FOREIGN PATENT DOCUMENTS

| | | | |
|---|---|---|---|
| 914172 | 6/1954 | Fed. Rep. of Germany | 74/394 |
| 923665 | 2/1955 | Fed. Rep. of Germany | 74/393 |
| 1101585 | 10/1955 | France . | |
| 2518677 | 6/1983 | France . | |
| 325996 | 3/1930 | United Kingdom | 74/394 |

Primary Examiner—Lawrence Staab
Assistant Examiner—Scott Anchell
Attorney, Agent, or Firm—Marshall, O'Toole, Gerstein, Murray & Bicknell

[57] ABSTRACT

A device for impulsively varying the timing of the rotation of a camshaft (1) relative to a driving sprocket wheel (14) mounted on a stubaxle (102) comprises followers (119,110) rotatable with respective follower shafts (103,104) mounted on the sprocket wheel (14) for rotation about axes parallel to the axis of rotation of the sprocket wheel and rotatable with the sprocket wheel; the follower shafts carrying planet gears (106,108) operative to transmit rotational movement in phase from the sprocket wheel to the camshaft via sun gear (107); and, an annular cam (117), whose angular position is adjustable by means of a worm wheel (112) and worm (111) arrangement, has an internal profile with which the followers (119,110) are held in engagement and which imparts periodic rotational movement to the follower shafts to carry the phase of the movement transmitted to the camshaft in a pulsed fashion.

8 Claims, 7 Drawing Sheets

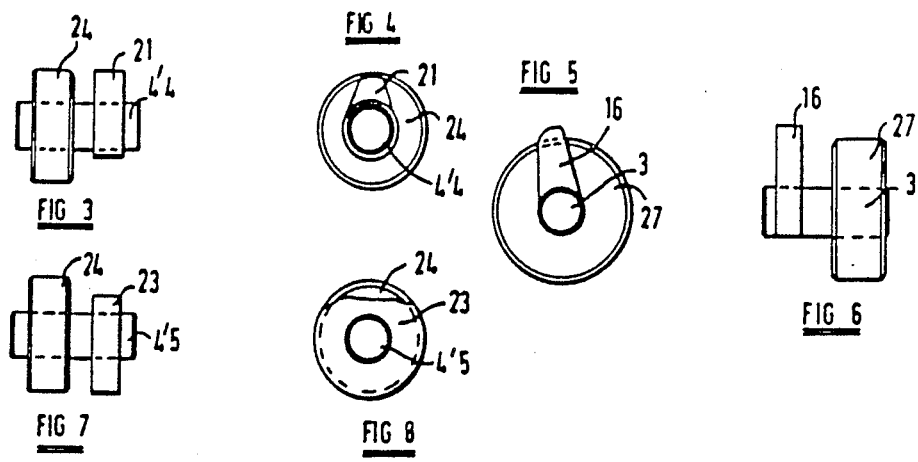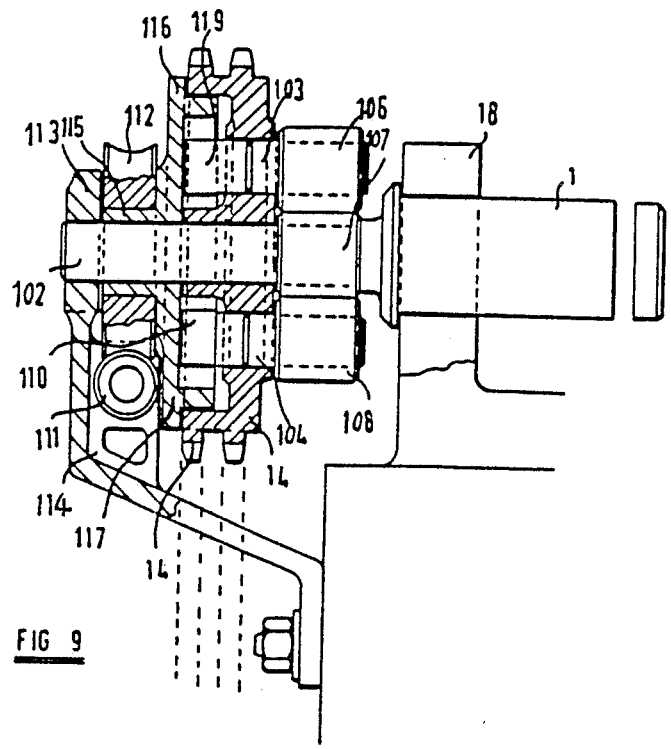

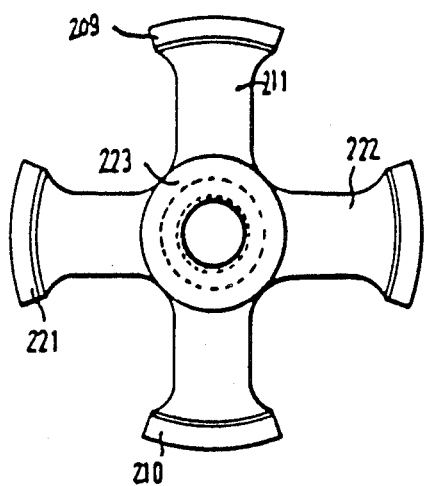
FIG_15
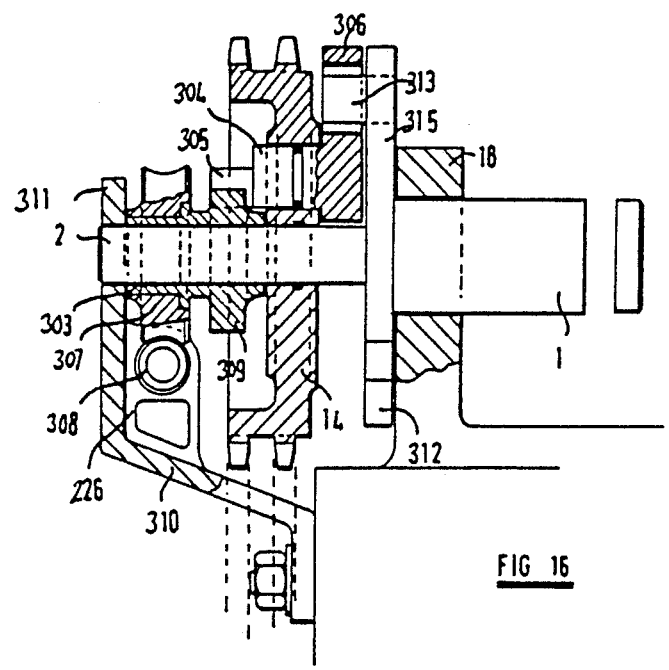
FIG_16

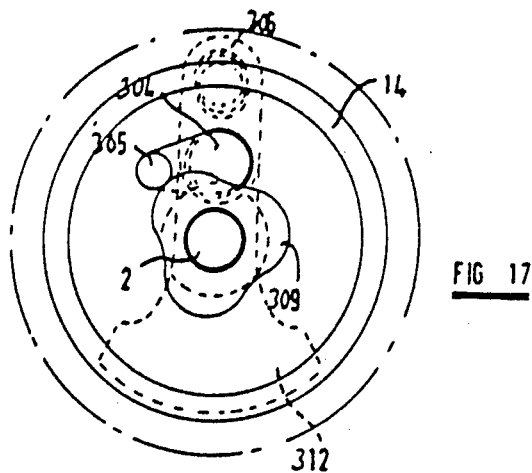
FIG 17
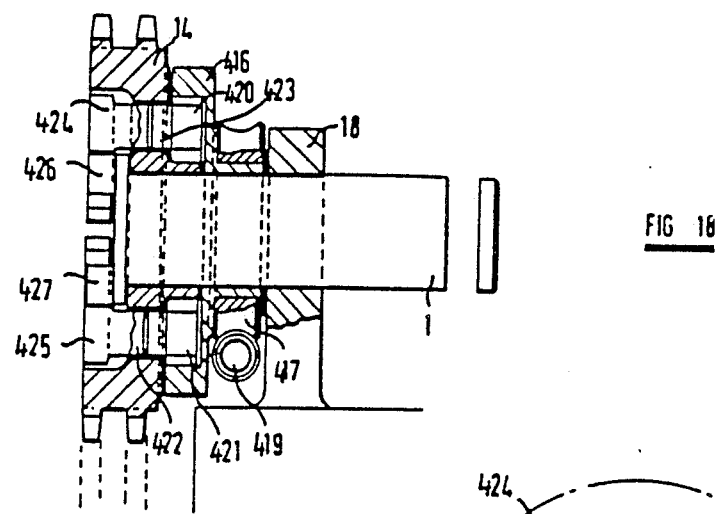
FIG 18
FIG 19
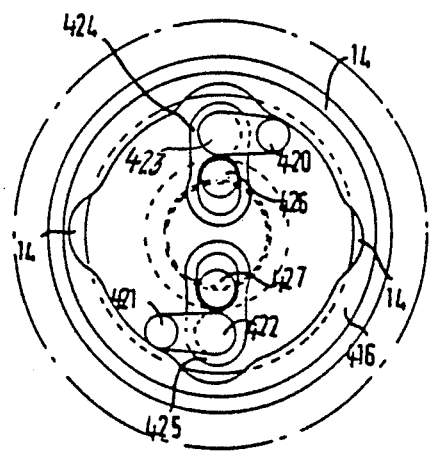

VARIABLE PHASE AND OSCILLATORY DRIVES

This invention relates to devices for providing variable timing of the rotation of a driven rotatable member relative to a driving rotatable member.

The invention finds particular application in internal combustion engines, particularly valve mechanisms for motor vehicle engines. However, these devices can be used in any context wherein it is deemed necessary, or desirable, to change the relative phase of related rotatable members or where the application of oscillatory, or repeated reciprocating motion, to one or more members, related or otherwise, is required.

Variable valve timing has, for some consderable time, been under consideration as a means of vastly improving the performance of internal combustion engines. However, the diffiuclty of providing a simple, cost effective means of realisation has proved to be a stumbling-block, for regardless of engine performance benefits, the means also has to be reliable.

The present invention is believed to offer a simple, cost effective and reliable means of achieving variable valve timing.

According to the invention, there is provided a device for varying the timing of the rotation of a driven rotatable member relative to a driving rotatable member, comprising a follower member rotatable with a follower shaft mounted on the driving member for rotation about an axis parallel to the axis of rotation of the driving member and rotatable with the driving member, the follower shaft carrying a drive element operative to transmit rotational movement in phase from the driving member to the driven member in the absence of rotation of the follower shaft, control means being provided for imparting rotational movement to the follower shaft via the follower to vary the phase of the movement transmitted to the driven member.

In order that the invention may be readily understood, embodiments thereof will now be described, by way of example, with reference to the accompanying drawings, in which:

FIGS. 3 and 4 are respectively a side view and an end view of a driving gear and cam assembly of the oscillatory drive mechanism;

FIGS. 5 and 6 are respectively an end view and a side view of a driven gear and follower assembly of the oscillatory drive mechanism.

FIGS. 7 and 8 are respectively a side view and an end view of a modified gear and cam assembly for the oscillatory drive mechanism;

FIG. 9 is a side elevation, partly in cross-section of a second device embodying the present invention incorporated into a camshaft drive system;

FIG. 15 shows component part-annular gears of the FIG. 14 embodiment;

FIG. 16 is a side elevation, partly in cross-section, of a fourth device embodying the present invention incorporated into a camshaft drive system;

FIG. 17 is an end view illustrating the construction of the oscillatory drive mechanism of the FIG. 16 device;

FIG. 18 is a side elevation, partly in cross-section, of a fifth device embodying the present invention incorporated into a camshaft drive system;

FIG. 19 is an end view illustrating the construction of the oscillatory drive mechanism of the FIG. 18 deivce.

Figure 1:
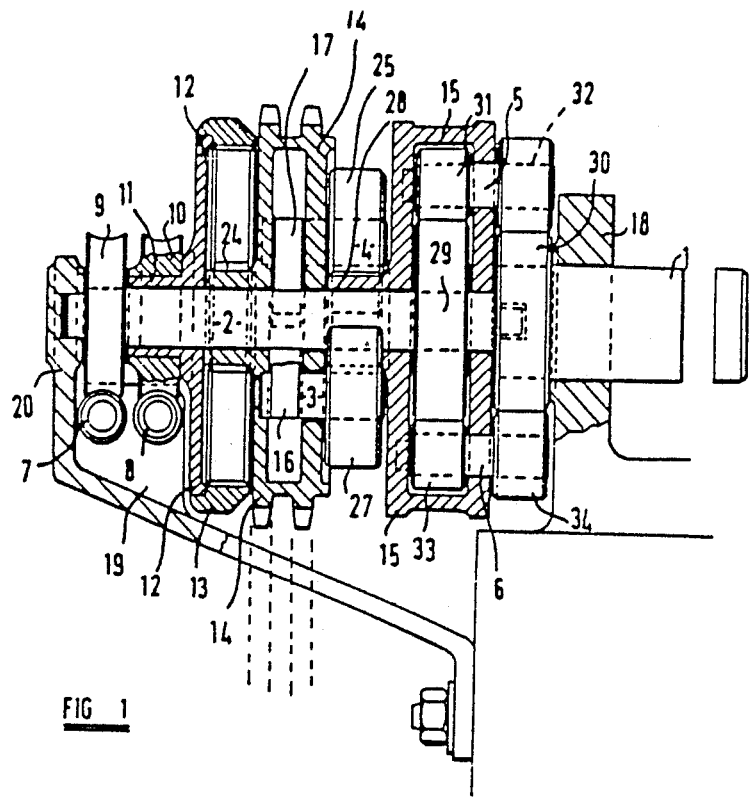
FIG. 1 is a side elevation, partly in cross-section, of a first device embodying the present invention and incorporated into the drive system of a camshaft of an internal combustion engine.
Figure 2:
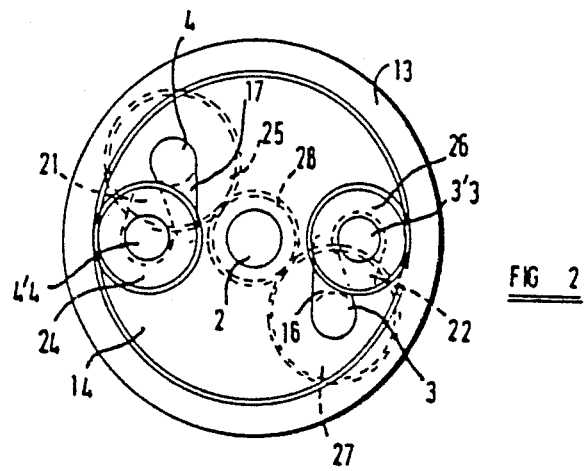
FIG. 2 is an end view with parts removed to illustrate the construction of an oscillatory drive mechanism of the FIG. 1 device.

In the drawings, all solid black areas represent bearing surfaces and/or devices.

FIGS. 1 to 8 show a device which has two basic capabilities, namely to provide variable oscillatory motion and to provide fully variable shaft timing, or phase changing.

As these two separate functional capabilities are not directly dependent upon one another, the layout can be considered as two independent devices. However, the layout does give some indication of the compactness of the two mechanisms and the way in which they might be incorporated into a single unit.

FIG. 1 is a cross-sectional side elevation showing the device to be built around the main camshaft drive sprocket 14 which can be driven in either direction, but for the sake of this description rotation in the clockwise direction (as seen from the lefthand end) is assumed.

Referring firstly to the embodiment of the invention illustrated in FIGS. 1 to 8, a sprocket wheel 14 for driving a camshaft 1 is mounted, in a free-running manner on a lay shaft 2 having one end located in a bearing provided in a support bracket 20. The other end of the lay shaft 2 is located by a centre bearing situated in the end face of the camshaft 1.

The sprocket wheel 14 acts as a carrier for two small shafts 3 and 4 and also for the two shafts 3′3 and 4′4, these four shafts being bearing located in free-running, but constant communication within the sprocket wheel 14.

Shaft 3 carries a planet gear 27 and a follower arm 16 (see FIG. 5), both of which are fixed to shaft 3 so that the assembly 3, 16, 27 moves as a unit. Shaft 4 is similarly provided with a planet gear 25 and a follower arm 17.

Shaft 3′3 carries a fixed cam 22 and planet gear 26 and shaft 4′4 similarly carries a cam 21 and planet gear 24. The shafts 3′3 and 4′4 are arranged in such a way as to allow respective fixed cams 21 and 22 thereon to rotate in the same plane as the followers 16 and 17 and to be in respective free-running contact with the latter. The gears 26 and 24 are engaged an annular gear 13 mounted on lay shaft 2 adjacent to sprocket wheel 14 and the indicated gear ratio is 3 : 1 for the camshaft arrangement envisaged here. However, depending upon the number of rotations required of shafts 3′3 and 4′4 this ratio could be increased or reduced.

The annular gear 13 is held in a stationary position, so that a single rotation of the sprocket wheel 14, in either direction, will cause planet gears 24 and 26 to roll around the internal tooth formation of the gear 13, thereby causing each of the assemblies 4′4, 21, 24 and 3′3, 22, 26 to rotate three times.

The two external planet gears 25 and 27 are engaged with a sun gear 28 forming part of a free-running carrier 15 mounted on the lay shaft 2. The sun gear could however be a separate item fixed to carrier 15, if required. Any oscillatory movement of followers 16 and 17 created by cams 21 and 22 will thus be transmitted to sun gear 28 via planet gears 25 and 27.

Carrier 15 is provided with two small lay-shafts 5 and 6, each of which is provided with compound planet gears. Shaft 5 carries planet gears 31 and 32 and shaft 6 carries planet gears 33 and 34. These two assemblies 5, 31, 32 and 6, 33, 34 are bearing located within carrier 15 and are, therefore, totally free-running. Gears 32 and 34 are engaged with a sun gear 30 and gears 31 and 33 are engaged with a sun gear 29.

The gear ratios indicated in the arrangement of FIG. 1 are as follows: gears 29, 31, 33 are at 3 : 1; and gears 30, 32, 34 are at 2 : 1. Therefore, assuming that sun gear 29 is held stationary and carrier 15 is rotated once, the sun gear 30 will be driven half of one revolution in the opposite direction to that the direction of rotation of carrier 15.

The sun gear 30 is fixed to, or part of, the main camshaft 1 (this being either an inlet or exhaust valve train or a camshaft common to both) and any resistance to rotation by shaft 1 will be reflected in the carrier (15); i.e. if camshaft 1 where locked solid, then carrier (15) could only rotate providing there was movement available in sun gear 29.

The sun gear 29 is fixed to, or part of, the lay shaft 2 and is, therefore, subject to rotational constraints and dictates applied to it by the shaft 2.

Control of shaft 2 is provided by the inclusion of a worm wheel 9 which is also fixed to, or part of, shaft 2. Worm wheel 9 is engaged with a worm 7 with a suitable ratio and lead angle of 10 degrees or less. By using a suitable lead angle, the combination of worm and worm wheel exhibits locking characteristics. Thus, with a lead angle of about 10 degrees, or less, the irreversible nature of the worm and worm wheel transmission provides an easy method of both controlling the shaft 2 and also locking said shaft.

This simple device therefore provides a variable reference for the timing of the camshaft. That is, by using the worm (driven electrically or otherwise) to rotate the worm wheel (in either direction), the sun gear 29 can be "advanced" or "retarded". If the sun gear 29 is rotated in the same direction as the direction of rotation of the camshaft 1, then this will advance the timing of the shaft. If however, it is rotated in the opposite direction to the shaft, then this will retard the camshaft timing. This arrangement for timing the camshaft can be regarded as a separate mechanism from the rest of the device shown in FIGS. 1 to 8 and can, if required, be constructed as a device in its own right.

The camshaft 1 is, in common with all camshafts, heavily loaded. This loading is the result of the combined resistance offered by the multiple valve-springs. This considerable resistance in the camshaft removes the need to provide tension springing within the oscillatory mechanism described above, for the loading is transmitted back towards the sprocket wheel 14 via the carrier 15 and sun gear 28. This is then passed on to the two planet gears 25 and 27. As the oscillatory cam followers 16 and 17 are fixed to, or part of, gears 25 and 27, the resistive feed-back from the camshaft is carried back to the interface(s) between these items and the cams 21 and 22. Thus, if there were no cam profiles present upon cams 21 and 22 (e.g. they were simply smooth, perfectly circular shafts) the two planets 25 and 27 would have no rotational capability whatsover, and would simply be locked. This can be understood by considering the tooth contact between planets 25 and 27 and sun gear 28. As sprocket wheel 14 is rotated, the planets 25 and 27 would try to roll around heavily loaded sun gear 28 and, in trying to roll, would as a matter of necessity, be required to rotate. The followers 16 and 17 would come to rest against the featureless lobes of cams 21 and 22 and, unable to rotationally progress further, would prevent shafts 3 and 4 from rotating. This would, in turn, prevent planets 25 and 27 from rotating, however, this would, produce an output of a continuous, nature from sprocket wheel 14 to carrier 15.

However, cams 21 and 22 do have lobes which feature eccentric profiles. Therefore, as shafts 4′4 and 3′3 are caused to rotate as a result of gears 24 and 26 walking around the inside of annular gear 13 at a suggested ratio of 3:1, these profiles will cause the followers to reciprocate against the cams, causing a small amount of reciprocal rotation in gears 25 and 27. The loading on the camshaft 1 will be sufficient to ensure that followers 16 and 17 remain in contact with cams 21 and 22.

Annular gear 13 is fixed to carrier 12, and this in turn is fixed to sleeve shaft 11, upon which is mounted worm wheel 10. Similar drive/locking capabilities are thereby accorded to annular gear 13 as to sun gear 29. If worm 8 is activated (in either direction) the annular gear 13 can be rotated in either direction and, as planet gears 24 and 26 are engaged with this annular gear, this will mean that these can be "advanced and/or retarded" through 360 degrees, causing the oscillatory pulses created by the profiles present upon cams 21 and 22 to be realised at any time throughout a revolution of the camshaft 1. Therefore, if a pulse is timed to coincide with say, the TDC of a valve-activating cam, this can be "moved" to any other point of the cam profile or, if required, to any point either side of the activating section of the lobe. This means that the pulse can be effective or non effective.

The cams 21 and 22 will cause shafts 3 and 4 to rotate slightly. Therefore, in the configuration shown, a very small amount of advance will be created, for as shafts 3 and 4 rotate in excess of their usual "locked" condition across (25/28/27), an extra amount of rotation will be impulsively imparted to sun gear 28, this being negated as the followers 16 and 17 return to their original position. However, if the cams situated along camshaft 1 are to be "slowed down" momentarily, then the profile selected would be more likely to resemble profile 23 as shown in FIG. 8. This would, in effect, hold a continuous advance throughout its rotational movement, until the "flat" section cams in contact with the followers 16 or 17, the resistance feed-back from camshaft 1 would cause a loss of advance as these followers would lose drive, so to speak, by allowing gears 25 and 27 to "walk" around gear 28. Their excursion would however, last only as long as the "flat" on cam and therefore, the reinstatement of continuous advance would again advance camshaft 1. This single reciprocative action, repeated on a continuous basis, provides true oscillatory motion.

An almost endless multitude of cam profiles could be used in the described oscillatory generator, and advance and/or retard configurations can be contemplated. Furthermore, the possibility of providing, say 16 degrees of advance, would allow the oscillatory pulse to be positioned so as to provide overlap of high engine speeds, the same profile being available at any part of the valve operating event. The overlap could then be "removed" at low engine speeds ensuring better performance as regards, for example, emissions.

A cam could also provide both advance and retard characteristics, thereby providing a desired cam "profile" for the valve operating cam which would be generated by the oscillatory mechanism rather than provided by an actual component shape at the tappet.

If two superimposed surfaces were used, i.e. the followers 16 and 17 were contoured as well as the cams 21 and 22, the carrier 12 for the annular gear 13 were able to be repositioned, and the carrier 15 remote from, but driven by, the sprocket 14 were also controllable, then any profile could be generated.

Moreover, the annular gear 13 could itself be subjected to oscillatory motion of a controllable nature; furthermore, annular gear 13 could be fixed, thereby providing a pulse at required timings without the ability to move said pulse.

As previously stated, the two functional elements of the described device are, or could be, separate devices in their own right. For example, the oscillatory mechanism could be mounted directly on a camshaft, and the shaft timing mechanism mounted upon the crankshaft. Either could be considered for mounting on either shaft, thereby cutting down the top sprocket size, i.e. by including a 2 : 1 reduction (the ratios across gears 31, 29, 33, 32, 30, 34 produce this input to output ratio) the sprocket 14 size can be reduced, thereby allowing styling changes in the overall vehicle design.

Shafts 3'3 and 4'4 could carry cams 21 and 22 of multi-lobe design, thereby providing more than one oscillatory pulse for each revolution of gears 24 and 26. A combination of advance and retard profiles could also be contemplated. Multi-lobe designs for cams 21 and 22 could be of a "one or more" definition, i.e. if the cams had two profiles (events) instead of the one indicated, then six pulses per sprocket wheel 14 revolution could be contemplated. Any number of pulses, designed to any shape at regular, or irregular intervals can be generated from this very simple arrangement.

A further variation not shown in FIGS. 1 to 8 is that a sun gear could be used between planets 24 and 26 thereby replacing the large annular gear 13.

A further variation would be to replace the direct cam contact between cams 21 and 22 and followers 16 and 17 by substituting cranks for cams 21 and 22 and altering gudgeon-pin holders for followers 16 and 17 with 21 and 17 and 22 and 16 then coupled by way of two small connectingrods. This would produce the necessary pulses but the character of the pulses would be equal in all respects, and quite unlike the cam generated pulses previously described.

The two worm and worm wheel devices 7, 9 and 8, 10 could be replaced by any suitable adjustment means, and whereas in this invention it is intended that electronic control be applied in order that the worms 7 and 8 be governed, it is also conceivable that they might be controlled mechanically, by direct linkage for example, or any suitable lever and or cable mechanism. Furthermore, a normal screw type of adjustment device may be included for manual setting.

Figure 10:
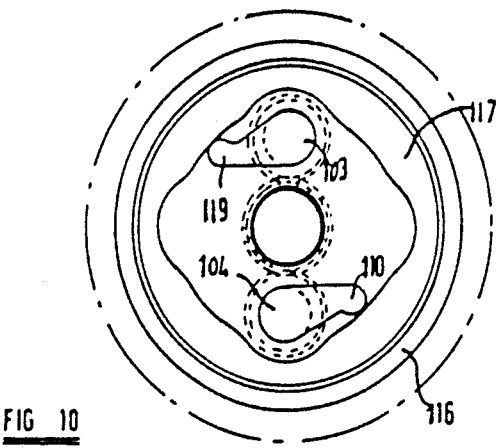
FIG. 10 is an end view illustrating the construction of the oscillatory drive mechanism of the FIG. 9 device.

FIGS. 9 and 10 show an oscillatory generator embodying the invention of extremely simple design which could be supplied as an "after market" or add on device rather than being only incorporated in original equipment. This mechanism could thus be sold over the counter as a replacement component and fitted to any existing camshaft nose. A variety of adaptors could be provided, thereby making one, or a few, stock items suitable for many different vehicle applications, the adaptors fitting directly on to the normal sprocket mounting flange.

The simplicity of the design is illustrated by FIGS. 9 and 10, and while annular-cam 117 is shown as being adjustable, it is contemplated that a fixed version would be advantageous to most engine applications, the addition of an oscillatory pulse during the valve opening, or closing event, would without any doubt, improve performance. However, by making annular-cam 117 capable of advance/retard movements overlap between the inlet and exhaust valve trains could be catered for, as could any further event characteristic.

The followers 119 and 110 are kept in firm contact with the annular cam 117 as a result of the resistance of camshaft. In FIG. 10 it is assumed that a clockwise rotation is desirable.

Annular cam 117 is mounted upon a carrier plate 116 and this in turn is fixed to, or part of a sleeve-shaft 115. Sleeve-shaft 115 is fixed to, or part of a worm wheel 112 which is itself engaged with worm 111.

This arrangement provides a means of rotating the assembly 116, 117. Any suitable means can be substituted and control can be electronic and/or mechanical governed by micro-processor linked to engine demand, or any demand mechanism, e.g. a vacuum type advance retard mechanism or direct throttle coupling.

Followers 119 and 110 are fixed to, or part of, shafts 103 and 104 and shafts fixed to, or part of, gears 106 and 108 which are engaged with sun gear 107 which is fixed to, or part of, camshaft 1.

Sprocket wheel 14 is driven in the usual way by a chain coupling with the crankshaft sprocket (not shown) and oscillatory motion can be generated.

The annular cam 117 gives four pulse per single sprocket revolution. However this is only an example and almost any number of pulses can be generated, these being profiled according to requirement. Furthermore, they can be advance and/or retard profiles.

Sprocket 14 and sleeve-shaft 115 are bearing located upon a stub-axle 102 which is fixed to, or part of, either camshaft 1 or bracket 113. In the illustrated case, the axle 102 is shown as being part of camshaft 1.

Worm, 111 is indicated as being mounted in a plate 114 and, as in FIGS. 1 to 8, the engine, or cylinder-head casting (bearing mount) is shown as item 18.

The followers 119 and 110 could be provided with roller contact items if required.

As in the embodiment of FIGS. 1 to 8, the number of follower assemblies can be varied according to requirements i.e. one or more such units can be included. This being so for any of the embodiments described herein.

FIGS. 11 to 15 illustrate another embodiment of the invention employing two follower mechanisms and a single external cam.

This is a particularly compact version of the invention, and offers controlled oscillatory motion in terms of single, or double concentric shaft application.

Figure 11:
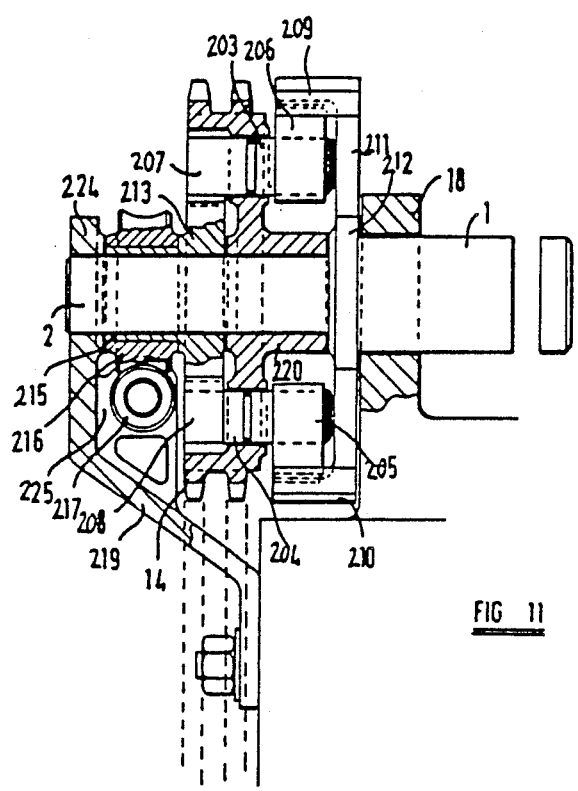
FIG. 11 is a side elevation, partly in cross-section, of a third device embodying the present invention incorporated into a camshaft drive system.

FIG. 11 shows a normal main camshaft 1 with an extension shaft 2 held by bearings located in journals 18 and 224. Located upon extension shaft 2, in free-running bearing contact, are two assemblies 213, 215, 216 and 14, 220, 207, 203, 206, 208, 204, 205. Components 209, 211, 210, 212 are fixed to, or part of, camshaft 1, 2.

Component 220 is a "sleeve-shaft" hub for sprocket 14.

Assemblies 207, 203, 206 and 208, 204, 205 are free-running (in bearing locations) "rocker" devices, comprising followers 207 and 208 shafts, 203 and 204 and semi planet gears 205 and 206. The components 205 and 206 could be complete gears; however, providing they have sufficient teeth to ensure maximum oscillatory (reciprocative) contact with the semi annular sections 209 and 210, there is no need for full gears to be used. Nevertheless, full gears (planets and annular items) can be substituted if required.

Gear section 209 is engaged with the teeth present upon semi planet 206, and gear section 210 is engaged with the teeth present upon semi planet 205.

Followers 208 and 207 are in contact with cam 213, and the resistance in the camshaft 1, 2 ensures continuous follower/cam contact. Cam 213 can be rotated (repositioned) by way of worm and worm wheel unit 216, 217.

Bracket 219 supports journal 224 and worm assembly mounting plate 225.

Figure 12:
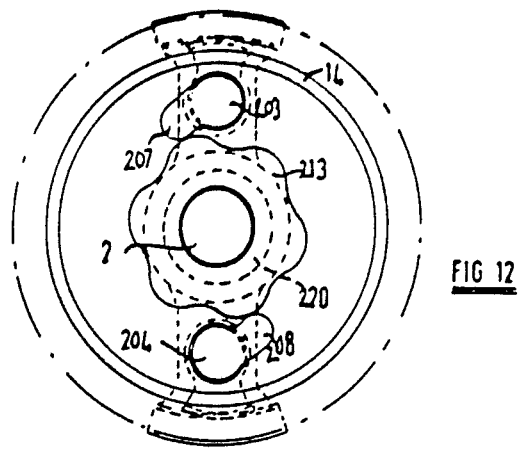
FIG. 12 is an end view illustrating the construction of the oscillatory drive mechanism of the FIG. 11 device.
Figure 13:
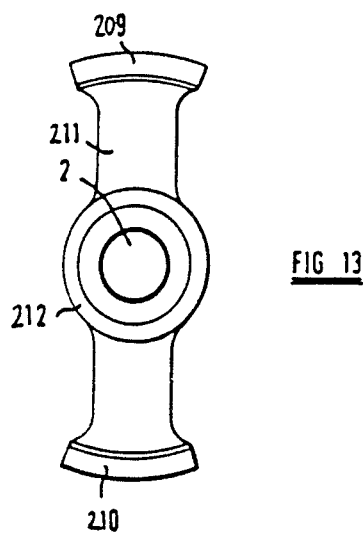
FIG. 13 shows a component part-annular gear of the FIG. 12 mechanism.

FIGS. 11 to 13 show the basic configuration of this device and the intended direction of rotational movement, driven by the sprocket 14 is clockwise as seen in FIG. 12.

If sprocket 14 is driven in the clockwise direction as indicated, then followers 207 and 208 are forced into contact with cam 213 by the resistance of camshaft ½. If extra contact pressure is required, further springing can be added between the sprocket and followers. This is also a possibility for any of the followers mentioned in this specification.

This follower/cam contact creates reciprocative action in shafts 203 and 204, thereby driving forward semi planets 205 and 206. This in turn accelerates the annular sections 209 and 210. However, the undulating cam profile, together with the continuous resistance creates an advance/retard effect; i.e. an oscillatory motion.

Figure 14:
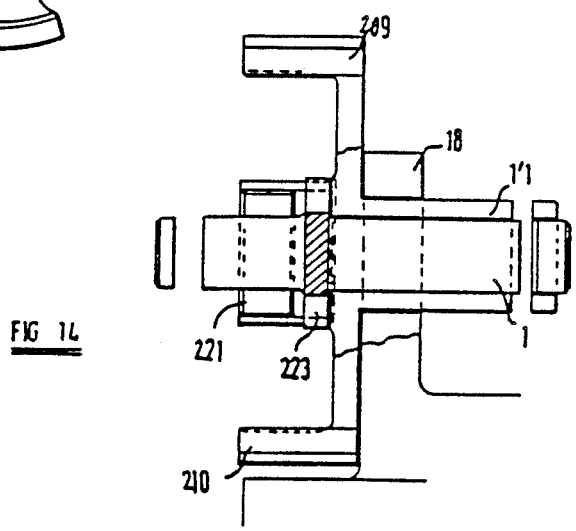
FIG. 14 illustrates a modified form of the device of FIGS. 11 to 13 adapted for use with concentric camshafts.

FIGS. 14 and 15 illustrate a possible layout of a device which has two concentric camshafts 1 and 1'1 provided with respective separate annular sections 209, 210 and 221, 222. Two sets of follower/shaft/planet devices would be provided, these following a single cam 213, or, if required, a second cam could be provided for the second set of followers. In all cases throughtout this specification, the cams may be fixed or adjustable.

The registration of the shaft bearings for the two different follower mechanisms may be out of phase; i.e. not necessarily at 180 degrees to each other. Furthermore, only one follower and one annular section per shaft may be used. In this way, several annular shafts could be used, each provided with a separate follower mechanism and, if required, separate cam. Furthermore, the output from the device could be coupled with shafts operating in parallel.

FIGS. 16 to 19 illustrate two further devices embodying the present invention.

Both devices feature worm and worm wheel control mechanism. However, as in all other embodiments, the control mechanism can be of any suitable type capable of rotating, or repositioning, the cam and then locking the cam in any position.

Camshaft 1 in FIG. 16 is provided with a crank 315 and an eccentric pin, or shaft 313. The camshaft and crank assembly 1, 315 provided with a counterbalance 312. An extension shaft 2 also extends from the end of camshaft 1.

Pin 313 is located, in free-moving contact, within an aperture formed in a lever 306 fixed to a shaft 304. A follower 305 is also fixed to shaft 304, and the whole assembly is bearing located in the carrier sprocket 14.

Follower 305 is in free-running contact with cam 309, which is fixed to worm wheel 307 via sleeve-shaft 303. Worm wheel 307 is engaged with worm 308 located in plate 226, this being part of bracket 310.

If sprocket wheel 14 is rotated, then lever 306 comes up against pin 313 and, the latter being fixed to, or part of, camshaft 1, the resistance tries to rock lever 306 backwards. However, the other end of shaft 304 has another lever in the shape of follower 305 and the reaction forces follower 305 against cam 309.

This action and reaction condition ensures drive and the undulating surface of cam 309 ensures oscillatory motion.

The advance/retard possibilities described for earlier embodiments only.

Assembly 305, 304, 306 is allowed to reciprocate in bearings carried by sprocket 14 and one or more such assemblies may be provided.

In FIGS. 18 and 19, the external cam 309 of FIGS. 16 and 17, is replaced by an annular cam 416 which is engaged by followers 420 and 421 fixed to shafts 422 and 423. Apertured levers 424 and 425 make up the two rocking, or reciprocating assemblies 424, 423, 420 and 425, 422, 421.

Followers 420 and 421 are in resistance enforced contact with annular cam 416 which is fixed to worm wheel 417 which is engaged with worm 419.

Pins 426 and 427 are fixed to, or part of, the nose of shaft 1, and these are respectively located in free-moving contact within the apertures present in levers 424 and 425.

Assembly 416, 417 is bearing upon camshaft 1.

FIG. 19 is looking from right to left along shaft 1 with shaft 1 removed, leaving pins 426 and 427 in their respective positions.

Sprocket wheel can be seen through the retard sections of annular cam 416 and also external to annular cam 16.

By rotating sprocket wheel 14 the levers 424 and 425 will rotate shaft 1 by way of pins 26 and 27. The followers 420 and 421 will, as a result of the peripheral surface shape of the internal cam 16, cause oscillatory motion of shaft 1 as a result of the rocking, or reciprocating action created in levers 424 and 425, the repeated reciprocations making oscillatory output motion to shaft 1.

This device is extremely compact and can, like the others described, feature a fixed cam if desirable.

These devices offer the possibility of providing any existing camshaft with an oscillatory generator; i.e. as an "after market", or off-the-shelf addon device. This would improve performance of any existing engine.

An oscillatory pulse would, for example, give the engineer faced with say, a good top end engine performance but poor bottom end power output, the opportunity of improving the bottom end without sacrificing the top end power and/or efficiency output. Overlap between the two camshafts (inlet and exhaust) can be reduced, or increased, by way of oscillatory motion being introduced, and as this can be varied, as shown throughout this specification, this will allow considerable performance, or fuel economy benefits (or both).

Direct mechanical (lever and/or cable etc) or electronic control can be used in conjunction with these devices, or in the case of a fixed cam, no control is required.

The cam profiles can create oscillatory pulses of any desired shape.

The number of variations made possible by this invention are many, and the basic principle can be applied to camshaft, or crankshaft, sprockets or carriers driven by said sprockets. They can be used in conjunction with phase changing devices, as shown, or can be part of a phase changing device.

Figure 20:
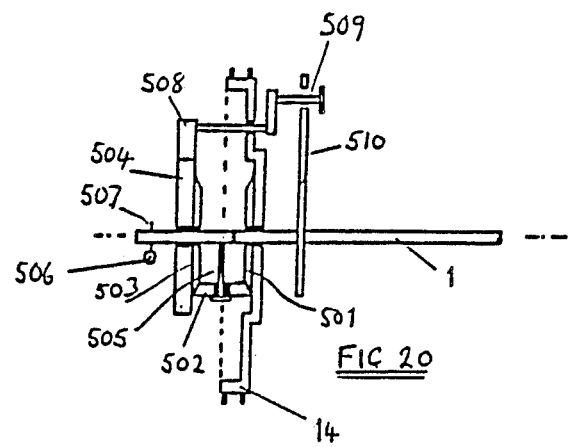
FIG. 20 is a diagram illustrating a driven cam device embodying the present invention.

FIG. 20 shows one of the many possible variations, in that, the sprocket is provided with a bevel gear 501, this is engaged with one or more idler bevels 502, and these are engaged with a bevel gear 503, fixed to, or part of the external type cam 504. The idler (or idlers) are located upon a carrier 505 and this is fixed to a cam shaft 1 controlled by a worm and worm wheel assembly 507, 507 (or some other suitable mechanism). As the idler 502 is held in a fixed position, until adjustment relocates it, the input rotation from the sprocket causes the cam to be driven in the opposite direction. Therefore, the FIG. 20 device represents a "driven" cam arrangement.

The cam could, for example, be provided with three phase changing pulse generating profiles, but as the cam is also rotating, for every single sprocket revolution, there would be six pulses generated. The timing can still be adjusted by moving the idler carrier. The coupling between the follower/eccentric 508, 509 is by way of a crank 510 mounted upon the camshaft.

A similar arrangement can be devised using an annular cam.

The features disclosed in the foregoing description, in the following claims and/or in the accompanying drawings may, both separately and in any combination thereof, be material for realising the invention in diverse forms thereof.

I claim:

1. A camshaft arrangement comprising:
   a camshaft supported for rotation about a first axis;
   a sprocket wheel for driving said camshaft, said sprocket wheel being supported for rotation about said first axis;
   a first follower shaft mounted on said sprocket wheel for rotation therewith about said first axis, said first follower shaft being supported by said sprocket wheel for rotation about a second axis parallel to said first axis;
   a second follower shaft mounted on said sprocket wheel for rotation therewith about said first axis, said second follower shaft being supported by said sprocket wheel for rotation about a third axis parallel to said first axis and located on the opposite side of said first axis from said second axis;
   first and second follower members carried by said first and second follower shafts respectively for rotation with said respective first and second follower shafts;
   first and second drive elements carried by said first and second follower shafts respectively for rotation with said respective first and second follower shafts, said first and second drive elements being spaced along said first axis from said first and second follower members;
   coupling means carried by said camshaft for rotation therewith and engaged by said first and second drive elements to impart rotational movement to said camshaft in phase with the rotation of said sprocket wheel and in the absence of rotation of said first and second follower shafts; and
   control means engaged by said first and second follower members for imparting oscillatory rotational movements to each of said first and second follower shafts in the course of rotation of said sprocket wheel to produce pulses in the rotational movement of said camshaft.

2. A camshaft arrangement according to claim 1 in which the control means includes a cam having a profile with which the first and second followers are held in engagement and a control shaft with which the cam is rotatable and means for rotating the control shaft.

3. A camshaft arrangement according to claim 2 in which the control shaft is mounted on the sprocket for rotation about an axis parallel to the axis of rotation of the sprocket, and the means for rotating the control shaft comprises a drive element carried by the control shaft and means for rotating the drive element as a result of rotation of the sprocket.

4. A camshaft arrangement according to claim 3 in which the drive element of the control shaft is a gear wheel engaging with a stationary annular gear so that the gear wheel is rotated upon rotation of the sprocket.

5. A device according to claim 1 in which the control means comprises a stationary control cam having a profile with which the first and second followers are held in engagement.

6. A camshaft arrangement according to claim 5 in which the stationary control cam is an annular cam having an internal cam profile.

7. A camshaft arrangement according to claim 5 in which the stationary control cam is a cam having an external cam profile.

8. A camshaft arrangement according to claim 5 wherein means are provided for adjusting the angular position of the control cam about the axis of rotation of the sprocket.

* * * * *